United States Patent
Kanaka et al.

(10) Patent No.: US 6,956,072 B1
(45) Date of Patent: Oct. 18, 2005

(54) THERMOPLASTIC RESIN COMPOSITION AND MOLDED OBJECT THEREOF

(75) Inventors: Keiichi Kanaka, Shizuoka (JP); Toshio Shiwaku, Shizuoka (JP); Mineo Ohtake, Shizuoka (JP)

(73) Assignee: Polyplastics Co., Ltd., Osaka (JP)

( * ) Notice: Subject to any disclaimer, the term of this patent is extended or adjusted under 35 U.S.C. 154(b) by 574 days.

(21) Appl. No.: 10/031,066

(22) PCT Filed: Jul. 12, 2000

(86) PCT No.: PCT/JP00/04671

§ 371 (c)(1),
(2), (4) Date: Jan. 15, 2002

(87) PCT Pub. No.: WO01/05890

PCT Pub. Date: Jan. 25, 2001

(30) Foreign Application Priority Data

Jul. 16, 1999 (JP) ................................. 11/202839

(51) Int. Cl.⁷ .......................... C08K 5/49; C08L 67/02; C09K 19/04
(52) U.S. Cl. ....................... 524/115; 524/116; 524/117; 524/123; 524/126; 524/127; 524/128; 524/136; 524/599; 524/601; 525/437; 525/439; 525/461; 525/538; 252/299.01; 428/1.33
(58) Field of Search .................. 252/299.01; 428/1.33; 525/437, 439, 461, 538; 524/115, 116, 117, 524/123, 126, 127, 128, 136, 599, 601

(56) References Cited

U.S. PATENT DOCUMENTS

| | | | | |
|---|---|---|---|---|
| 5,451,626 A | * | 9/1995 | Kumaki et al. | 524/370 |
| 5,514,739 A | * | 5/1996 | Aketa et al. | 524/108 |
| 5,679,284 A | * | 10/1997 | Kurita | 252/299.01 |
| 5,679,288 A | * | 10/1997 | Kim et al. | 252/609 |
| 5,833,886 A | * | 11/1998 | Dashevsky et al. | 252/601 |
| 6,127,466 A | * | 10/2000 | Murakami et al. | 524/127 |
| 6,280,668 B1 | * | 8/2001 | Saito et al. | 264/108 |
| 6,348,163 B1 | * | 2/2002 | Long et al. | 252/299.01 |
| 6,414,072 B2 | * | 7/2002 | Murakami et al. | 524/464 |

FOREIGN PATENT DOCUMENTS

| | | |
|---|---|---|
| EP | 0 653 460 A2 | 5/1995 |
| JP | 05070700 A | 3/1993 |
| JP | 05112709 A | 5/1993 |
| JP | 7-179743 | 7/1995 |

OTHER PUBLICATIONS

Yoshinaga Abe et al., ed., "Plastics Haigouzai; Kiso to Ouyou (new printing)", Taiseisha, (Jan. 30, 1984), p. 227.

* cited by examiner

Primary Examiner—Jeffrey B. Robertson
(74) Attorney, Agent, or Firm—Burns, Doane, Swecker & Mathis, LLP

(57) ABSTRACT

To provide a resin composition, in which a liquid crystal polymer is made into fiber in a molded article to exhibit an extremely high reinforcing effect which has not been available yet, and from which a molded article having an excellent mechanical strength can be manufactured in a stable manner. That is, a thermoplastic resin composition, wherein 100 parts by weight in total consisting of 99-50 parts by weight of a thermoplastic polyester resin (A) not forming an anisotropic molten phase and 1-50 parts by weight of a liquid crystal polymer (B) capable of forming an anisotropic molten phase is blended with 0.001-2.0 parts by weight of one or more kinds of compounds (C) selected from phosphorus oxoacid monoester and diester represented by the following formulae (I) and (II):

$$(X)_n P(=O)(OR)_{3-n} \qquad (I)$$

$$(X)_n P(OR)_{3-n} \qquad (II)$$

wherein n is 1 or 2; X is a hydrogen atom, a hydroxyl group or a monovalent organic group and, when there are plural X's, they may be the same or different; and R is a monovalent organic group and, when there are plural R's, they may be the same or different.

25 Claims, No Drawings

THERMOPLASTIC RESIN COMPOSITION AND MOLDED OBJECT THEREOF

TECHNICAL FIELD OF THE INVENTION

The present invention relates to a resin composition blended with a thermoplastic polyester resin not forming an anisotropic molten phase and a liquid-crystal polymer, and a molded article thereof.

BACKGROUND ART

A liquid-crystal polymer (LCP) capable of forming an anisotropic molten phase is a thermoplastic resin having numerous properties such as high strength, high rigidity, high thermal resistance, mold processability. However, it makes a difference in molding shrinkage and mechanical properties between a molecular chain orientation direction and a transverse direction, and further, it has commercial disadvantages such as high cost.

On the other hand, a thermoplastic polyester resin such as polycarbonate resin (PC), which dose not form an anisotropic molten phase, is relatively inexpensive, but there is a disadvantage that it is inferior to LCP in the physical properties such as heat resistance and rigidity. Especially, since the resin lacks enough rigidity to use for a thin-film housing, it must be thickened on a design. Therefore, there is a limit in its applicability to recent miniaturization/lightening in the fields of electric, electronic, and communication apparatus.

Many trials have, then, been made to make the most of the advantages of LCP and thermoplastic resin not forming an anisotropic molten phase while making up the disadvantages of both by mixing and using them. However, an injection-molded article of a resin composition obtained by simply blending a thermoplastic resin with a small amount of LCP, cannot utilize the LCP's properties such as high strength, high rigidity, thermal resistance and moldability, and results in remarkable deterioration of the mechanical strength. This is because the exhibition of LCP's high mechanical properties and the like originates from a molecular orientation formed under shear and stretch stresses during melt processing. In the resin composition obtained by simply blending a thermoplastic resin and a small amount of LCP, although molecules are particularly oriented in the vicinity of the surface layer of the molded article, most of LCP, other than the surface layer, are only spherically dispersed in a matrix of the thermoplastic resin and provided with no reinforcing effect. Specifically, it is not until LCP takes the form of fibers inside the molded article that LCP molecules are oriented in the length direction of a fibrous configuration, so that the resin is provided with the reinforcing effect.

Moreover, when the proportion of LCP increases and the thermoplastic resin not forming an anisotropic molten phase is reduced, LCP this time becomes a matrix in which the thermoplastic resin is dispersed as islands. Such the resin composition is of little utility value since the advantages of the thermoplastic resin cannot be utilized.

Accordingly, methods of producing a molded article containing fibrous LCP provided with a reinforcing effect have been proposed as described in JP-A 5-70700 and JP-A 5-112709, wherein a molding material is first prepared beforehand by stretching and extruding LCP and a thermoplastic resin such as PC at a temperature at which both are molten so that LCP is present as fibers having a high aspect ratio, and then, during molding to form the molded article, the molding material is molded at a temperature at which LCP fails to be molten and only the thermoplastic resin such as PC is molten.

In these methods, however, LCP is stretched and extruded in advance to be oriented as fibers. Alternatively, to form the molded article without any preparation, LCP needs to be formed into fibers by applying a considerable shearing force when a mold is filled up with the resin composition. The former case supposedly results in deteriorated fluidity and limited molding conditions. In the latter case, there are a remarkable influence of the molded article's shape and a possibility of insufficient strength due to partially insufficient fibrous forming.

In consideration of the aforementioned problems, a resin composition has been discovered in which, by blending a specific phosphorus compound such as a pentaerythritol-type triester phosphite, it is no longer necessary to extrude LCP in advance so that it is oriented in a fibrous state, LCP is easily modified into a fibrous state to exhibit a reinforcing effect in molding at such a temperature that the LCP is allowed to flow in a sufficient degree, and thereby the mechanical strength, heat resistance, molding-easiness, etc. of the obtained molded article record quite high values closer to those of LCP (JP-A 7-179743). This resin composition is a material having excellent properties as a molding material for a thin-wall molded article. The most distinct characteristic of this resin composition lies in that LCP is easily modified into a fibrous state by injection molding as described above, an extremely high reinforcement effect which has never been observed is obtained, and therefore the resulting molded article has unique properties and can be a thin-wall one especially excellent in mechanical strength.

However, in the resin composition, there arises a problem that the excellent properties of the molded article expected as described above, are unstable due to a variation of melt-kneading conditions in producing the molding material such as the degree of exhaust from a vent and the degree of contact with ambient air. Therefore, an additive which achieves an excellent effect in a more stable manner has been required.

In consideration of the aforementioned problems, the inventors of the present invention have assiduously studied to obtain a resin composition which can stably exhibit excellent properties as a molding material. As a result, they have discovered that, by injection molding a resin composition, in which one or more kinds of compounds selected from phosphorus oxoacid monoesters and diesters has been added to a resin component comprising a liquid crystal polymer and a thermoplastic polyester resin which does not form an anisotropic molten phase, LCP is easily modified into a fibrous state in the molded article and exhibits an extremely high reinforcing effect which has never been observed, and therefore the resulting molded article has unique properties and an excellent mechanical strength, and these characteristics are stably exhibited in the controllable production conditions of the resin composition. Thus, the present invention has been accomplished.

DISCLOSURE OF THE INVENTION

That is, the present invention relates to a thermoplastic resin composition, prepared by blending 100 parts by weight in total consisting of 99 to 50 parts by weight of a thermoplastic polyester resin (A) which does not form an anisotropic molten phase and 1 to 50 parts by weight of a liquid crystal polymer (B) capable of forming an anisotropic molten phase, and 0.001 to 2.0 parts by weight of one or more kinds of compounds (C) selected from phosphorus oxoacid monoesters and diesters represented by the following formulae (I) and (II):

$$(X)_nP(=O)(OR)_{3-n} \quad (I)$$

$$(X)_nP(OR)_{3-n} \quad (II)$$

wherein n is 1 or 2; X is a hydrogen atom, a hydroxyl group or a monovalent organic group and, when there are plural X's, they may be the same or different; and R is a monovalent organic group and, when there are plural R's, they may be the same or different.

Namely, a composition comprising (A), (B) and (C) at a ratio as above shown.

The component (C) may include phosphonates represented by the following formula (IV):

wherein Y is a divalent α, ω-dioxy organic group.

Particularly, a characteristic of the present invention is to provide a molded article excellent in mechanical strength on which fibrously oriented LCP acts as reinforcing component by using the phophorus oxoacid monoesters and diesters.

DETAILED DESCRIPTION OF THE INVENTION

The present invention will be described in detail hereinafter.

Examples of the thermoplastic polyester resin (A) not forming an anisotropic molten phase which is used in the present invention include polyesters obtained by polycondensation of a dicarboxylic acid compound and a dihydroxy compound, polycondensation of oxycarboxylic acid compounds, or polycondensation of a mixture of these three components, and either homopolyesters or copolyesters can be effective on the present invention. Examples of the dicarboxylic acid compound herein include an aromatic dicarboxylic acid, an alicyclic dicarboxylic acid, an aliphatic dicarboxylic acid, a heterocyclic dicarboxylic acid, a multifunctional carboxylic acid, and ester-forming derivatives thereof such as alkyl esters and phenyl esters of the above-mentioned carboxylic acids. Specifically, terephthalic acid, isophthalic acid, phthalic acid, naphthalenedicarboxylic acid, biphenyldicarboxylic acid, stilbenedicarboxylic acid, 2,2-(biscarboxyphenyl)propane, biscarboxyphenyl sulfone, cyclohexanedicarboxylic acid, succinic acid, adipic acid, sebacic acid, dodecanoic diacid, dimer acid, pyridinedicarboxylic acid, trimellitic acid, trimesic acid, pyromellitic acid, and ester-forming derivatives thereof are cited. These compounds may be used singly or as a combination of two or more compounds. Examples of the dihydroxy compounds used herein include ethylene glycol, propane diol, butane diol, hexane diol, neopentyl glycol, cyclohexane diol, cyclohexanedimethanol, diethylene glycol, triethylene glycol, hydroquinone, bisphenol A, bisphenol S, biphenol, 2,2-(bishydroxyethoxyphenyl)propane, bishydroxyethoxyphenyl sulfone, 4,4-bis(hydroxyethoxy) biphenyl, dimerdiol, polyethylene glycol, polytetramethylene glycol, trimethylolpropane, pentaerythritol and ester-forming derivatives thereof. They may be used singly or as a combination of two or more compounds. Examples of the oxycarboxylic acid include hydroxybezoic acid, hydroxynaphthoic acid, 4-hydroxy-4'-carboxybiphenyl and ester-forming derivatives thereof. They may be used singly or as a combination of two or more compounds.

Another example of the thermoplastic polyester resin (A) not forming an anisotropic molten phase which is used in the present invention, is a polycarbonate resin having a repeating unit represented by the following formula (V):

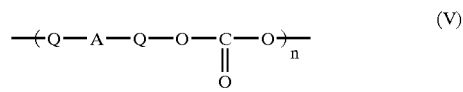

wherein Q is selected from aromatic groups such as naphthylene, phenylene, halogen-substituted phenylene and alkylene group-substituted phenylene; A is selected from —$CR_1R_2$—, >C=O, —O—, —S—, —SO— and —$SO_2$—, in which $R_1$ and $R_2$ are selected from H, a hydrocarbon group and a group which forms a cycloalkane group with adjacent carbon atoms.

Specifically, the polycarbonate resin is a polycarbonate based polymer produced by reacting one or more kinds of bisphenol compounds with phosgene or diester carbonate. Examples of the bisphenol compounds include: bis(hydroxyaryl)alkanes such as bis(4-hydroxyphenyl)methane, 1,1-bis(4-hydroxyphenyl)ethane, 1,1-bis(4-hydroxyphenyl)propane, 2,2-bis(4-hydroxyphenyl)propane, 2,2-bis(4-hydroxyphenyl)butane, 2,2-bis(4-hydroxyphenyl)pentane, 2,2-bis(4-hydroxyphenyl)octane, 2,2-bis(4-hydroxyphenyl)-3-methylbutane, 2,2-bis(4-hydroxyphenyl)hexane, 1,1-bis(4-hydroxyphenyl)cyclopentane, 1,1-bis(4 -hydroxyphenyl)cyclohexane, bis(4-hydroxy-3-methylphenyl)methane, 1,1-bis(4-hydroxy-3-methylphenyl)ethane, 2,2-bis(4-hydroxy-3-methylphenyl)propane, 2,2-bis(4-hydroxy-3,5-dimethylphenyl)propane, 2,2-bis(4-hydroxy-3-ethylphenyl)propane, 2,2-bis(4-hydroxy-3-t-butylphenyl)propane, 2,2-bis(4-hydroxy-3-bromophenyl)propane, bis(4-hydroxyphenyl)phenylmethane, bis(4-hydroxyphenyl)diphenylmethane, bis(4-hydroxyphenyl)dibenzylmethane, 1,1-bis(4-hydroxyphenyl)-1-phenylpropane, and 2,2,2',2',-tetrahydro 3,3,3',3'-tetramethyl-1,1'-spirobi-[1H-indene]-6, 6'-diol; dihydroxyaryl ketones such as 4,4'-dihydroxydiphenyl ketone, 4,4'-dihydroxy-3,3'-dimethyldiphenyl ketone; dihydroxyaryl ethers such as 4,4'-dihydroxydiphenyl ether, 4,4'-dihydroxy-3,3'-dimethyldiphenyl ether; dihydroxyaryl sulfides such as 4,4'-dihydroxydiphenyl sulfide, 4,4'-dihydroxy-3,3'-dimethyldiphenyl sulfide; dihydroxyaryl sulfones such as 4,4'-dihydroxydiphenyl sulfone, 4,4'-dihydroxy-3,3'-dimethyldiphenyl sulfone; dihydroxyaryl sulfoxides such as 4,4'-dihydroxydiphenyl sulfoxide, 4,4'-dihydroxy-3,3'-dimethyldiphenyl sulfoxide.

Among them, one or more kinds of resins selected from a polycarbonate resin, a polyalkyleneterephthalate resin and a polyarylate resin is especially preferably employed as the thermoplastic polyester resin (A) not forming an anisotropic molten phase which is used in the present invention. More preferably sekected is one or more kinds of resins selected from a polycarbonate resin and a polyarylate resin, and most preferably, a polycarbonate resin.

The polyalkylene terephthalate resin may be polyethylene terephthalate and/or polybutylene terephthalate resin.

The liquid-crystal polymer (LCP) (B) capable of forming an anisotropic molten phase used in the present invention refers to a melt-processed polymer with the property that it can form an optically anisotropic molten phase. The properties of an anisotropic molten phase can be confirmed by the conventional polarization inspection method using orthogonal polarizers. More specifically, confirmation of anisotropy in a molten phase can be attained by using a Leitz polarization microscope and observing a molten sample mounted on a Leitz hot stage under the nitrogen atmosphere at a magnification of 40 times. The LCP applicable to the present invention exhibits an optical anisotropy wherein a polarized light penetrates even in a static molten phase, when observed between cross polarizers. As the LCP usable in the present invention, aromatic polyester and aromatic polyester amide are preferable, and polyester partially containing these structures in the same molecular chain is also preferable.

Examples of the components or monomer groups constituting such LCP include:
(1) an aromatic hydroxycarboxylic acid, an aromatic aminocarboxylic acid and derivatives thereof;
(2) an aromatic dicarboxylic acid, an alicyclic dicarboxylic acid and derivatives thereof;
(3) an aromatic diol, an alicyclic diol, an aliphatic diol and derivatives thereof; and
(4) an aromatic hydroxyamine, an aromatic diamine and derivatives thereof. By using these components, the LCP is constituted, for example, of solely (1), or a combination of, for example, (2) and (3), (2) and (4), (1), (2) and (3), (1) (2) and (4), and (1), (2), (3) and (4).

Examples of the aromatic hydroxycarboxylic acid and the aromatic aminocarboxylic acid (1) include 4-hydroxybenzoic acid, 3-hydroxybenzoic acid, 6-hydroxy-2-naphthoic acid, 6-hydroxy-1-naphthoic acid, 4-(4-hydroxyphenyl)benzoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 3-phenyl-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 3,5-dichloro-4-hydroxybenzoic acid, 2,5-dichloro-4-hydroxybenzoic acid, 2,6-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 4-aminobenzoic acid, 3-aminobenzoic acid, 6-amino-2-naphthoic acid and the like.

Examples of the aromatic dicarboxylic acid and the alicyclic dicarboxylic acid (2) include terephthalic acid, isophthalic acid, 2,6-naphthalenedicarboxylic acid, 2,7-naphthalenedicarboxylic acid, 1,4-naphthalenedicarboxylic acid, 1,5-naphthalenedicarboxylic acid, 4,4'-diphenylcarboxylic acid, 3,4'-diphenylcarboxylic acid, 3,3'-diphenylcarboxylic acid, 4,4"-terphenyldicarboxylic acid, diphenylether-4,4'-dicarboxylic acid, diphenoxyethane-4,4'-dicarboxylic acid, methylterephthalic acid, dimethylterephthalic acid, phenylterephthalic acid, methoxyterephthalic acid, chloroterephthalic acid, dichloroterephthalic acid, bromoterephthalic acid, 1,4-cyclohexanedicarboxylic acid, 1,3-cyclohexanedicarboxylic acid, [2.2.2]bycyclooctanedicarboxylic acid.

Examples of the aromatic diol, alicyclic diol and aliphatic diol (3) include hydroquinone, resorcinol, 2,6-naphthalene diol, 1,5-naphthalene diol, 2,7-naphthalene diol, 4,4'-dihydroxydiphenyl, 3,3'-dihydroxydiphenyl, 3,4'-dihydroxydiphenyl, 4,4"-dihydroxyterphenyl, 4,4'-dihydroxydiphenyl ether, 2,2-bis(4-hydroxyphenyl)propane, 4,4'-dihydroxyphenyl ketone, 4,4'-dihydroxydiphenyl sulfide, 4,4'-dihydroxydiphenyl sulfoxide, N-(4-hydroxyphenyl)-3-hydroxyphthalimide, chlorohydroquinone, methylhydroquinone, 2,5-dimethylhydroquinone, t-butylhydroquinone, 2,5-di-t-butylhydroquinone, phenylhydroquinone, methoxyhydroquinone, chlorohydroquinone, 4-methylresorcinol, 4-chlororesorcinol, 3,3'-dimethyl-4,4'-dihydroxydiphenyl, 1,4-cyclohexanediol, 1,3-cyclohexanediol, 1,4-cyclohexanedimethanol, 1,3-cyclohexanedimethanol, ethylene glycol, 1,3-propanediol, 1,4-butanediol.

Examples of the aromatic hydroxyamine and aromatic diamine (4) include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 2,6-diaminonaphthalene, 4,4'-diaminodiphenyl, 4,4'-diaminodiphenylmethane.

In addition, a molecular weight adjusting agent may be added to the above components, if necessary. Examples of the molecular weight adjusting agent include monofunctional components such as benzoic acid, phenol and 4-phenylphenol.

Among the components described above, more preferably examples are those which contain as essential components one or more kinds of compounds selected from naphthalene compounds, biphenyl compounds and phenylene compounds. Typical examples of such liquid crystal polymers include the followings:

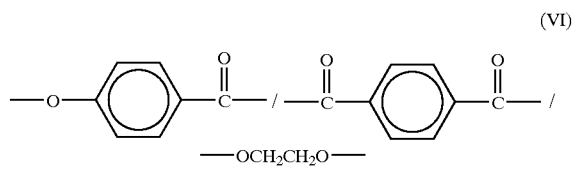

(VI)

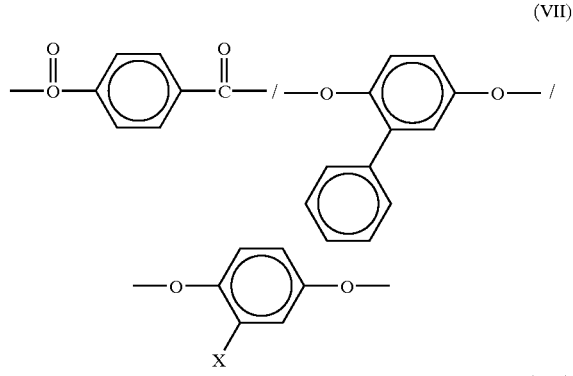

(VII)

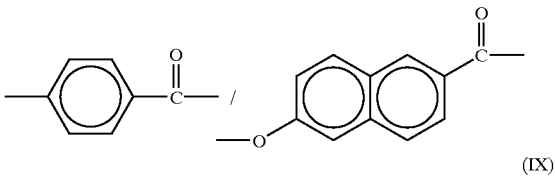

(VIII)

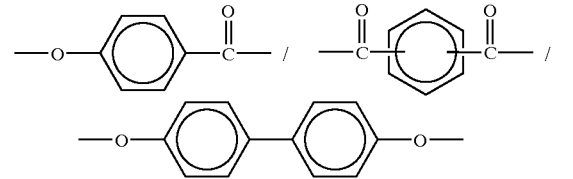

(IX)

-continued

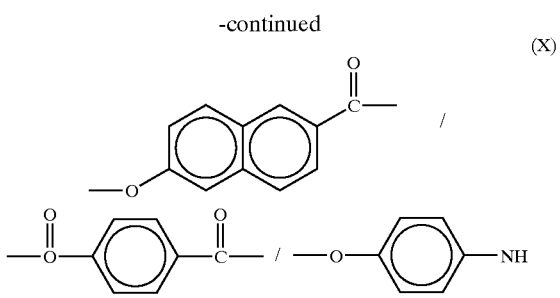

In the present invention, the ratio of the thermoplactic resin (A) not forming an anisotropic molten phase to the liquid crystal polymer (B) [(A)/(B)] is 99/1 to 50/50, preferably 99/1 to 80/20. When (A)/(B) is larger than 99/1, the fiberized LCP does not exhibit substantial reinforcing effects and an advantage cannot be obtained over the properties of the thermoplactic resin (A) contained only. On the other hand, when (A)/(B) is smaller than 50/50, since the matrix is the liquid crystal polymer, the properties of the thermoplastic polyester resin cannot be utilized undesirably.

The effect of blending the compound (C) of the present invention is in that the compound (C) is highly effective as a dispersing assistant for micro-dispersing LCP (B) in the matrix phase and that the mechanical properties of the product are distinctively improved. In addition, this effect is stable as compared with that of the conventional phosphorus compound (triester phosphite).

The phosphorus oxoacid monoesters and diesters (C) used in the present invention are represented by the following formulae (I) and (II):

$$(X)_n P(=O)(OR)_{3-n} \qquad (I)$$

$$(X)_n P(OR)_{3-n} \qquad (II)$$

wherein n is 1 or 2; X is a hydrogen atom, a hydroxyl group or a monovalent organic group and, when there are plural X's, they may be the same or different; and R is a monovalent organic group and, when there are plural R's, they may be the same or different.

Generally, phosphonate compounds, phophinate compounds, phosphonite compounds, phosphinite compounds and organic phosphorus compounds containing these phosphorus components in the molecule are applicable.

Specific examples of the phosphonate compound include dimethylphosphonate, diethylphosphonate, dibutylphosphonate, di(ethylhexyl)phophonate, didecylphosphonate, dipalmitylphosphonate, distearylphosphonate, dilaurylphosphonate, diphenylphosphonate, dibenzylphosphonate, ditoluylphosphonate, di(nonylphenyl)phosphonate, dioleylphosphonate, dimethylmethylphosphonate, diethylmethylphosphonate, di(ethylhexyl)methylphosphonate, dipalmitylmethylphosphonate, distearylmethylphosphonate, dilaurylmethylphosphonate, diphenylmethylphosphonate, dimethylphenylphosphonate, diethylphenylphosphonate, di(ethylhexyl)phenylphosphonate, dipalmitylphenylphosphonate, distearylphenylphosphonate, dilaurylphenylphosphonate, diphenylphenylphosphonate, and dibenzylphenylphosphonate.

Specific examples of the phosphinate compound include methylphosphinate, ethylphosphinate, butylphosphinate, ethylhexylphosphinate, palmitylphosphinate, stearylphosphinate, laurylphosphinate, phenylphosphinate, benzylphosphinate, toluylphosphinate, nonylphenylphosphinate, oleylphosphinate, ethylmethylphophinate, ethyldimethylphosphinate, (ethylhexyl)methylphosphinate, (ethylhexyl)dimethylphosphinate, palmitylmethylphosphinate, palmityldimethylphosphinate, stearylmethylphosphinate, stearyldimethylphosphinate, laurylmethylphosphinate, lauryldimethylphosphinate, phenylmethylphosphinate, ethylphenylphosphinate, (ethylhexyl)phenylphosphinate, palmitylphenylphosphinate, stearylphenylphosphinate, stearyldiphenylphosphinate, laurylphenylphosphinate, lauryldiphenylphosphinate, phenylphenylphosphinate, and benzylphenylphosphinate.

Specific examples of the phosphonite compound include dimethylphosphonite, diethylphosphonite, dibutylphosphonite, di(ethylhexyl)phosphonite, didecylphosphonite, dipalmitylphosphonite, distearylphosphonite, dilaurylphosphonite, diphenylphosphonite, dibenzylphosphonite, ditoluylphosphonite, di(nonylphenyl)phosphonite, dioleylphosphonite, dimethylmethylphosphonite, diethylmethylphosphonite, di(ethylhexyl)methylphosphonite, dipalmitylmethylphosphonite, distearylmethylphosphonite, dilaurylmethylphosphonite, diphenylmethylphosphonite, dimethylphenylphosphonite, diethylphenylphosphonite, di(ethylhexyl)phenylphosphonite, dipalmitylphenylphosphonite, distearylphenylphosphonite, dilaurylphenylphosphonite, diphenylphenylphosphonite, and dibenzylphenylphosphonite.

Specific examples of the phosphinite compound include methylphosphinite, ethylphosphinite, butylphosphinite, ethylhexylphosphinite, palmitylphosphinite, stearylphosphinite, laurylphosphinite, phenylphosphinite, benzylphosphinite, toluylphosphinite, nonylphenylphosphinite, oleylphosphinite, ethylmethylphosphinite, ethydimethylphosphinite, (ethylhexyl)methylphosphinite, (ethylhexyl)dimethylphosphinite, palmitylmethylphosphinite, palmityldimethylphosphinite, stearylmethylphosphinite, stearyldimethylphosphinite, laurylmethylphosphinite, lauryldimethylphosphinite, phenylmethylphosphinite, ethylphenylphosphinite, (ethylhexyl)phenylphosphinite, palmitylphenylphosphinite, stearylphenylphosphinite, stearyldiphenylphosphinite, laurylphenylphosphinite, lauryldiphenylphosphinite, phenylphenylphosphinite, and benzylphenylphosphinite. Among them, the phosphonic acid ester represented by the formula (III) is especially preferable:

$$H(OH)_m P(=O)(OR)_{2-m} \qquad (III)$$

wherein m is 0 or 1 and R is a monovalent organic group.

As the phosphorus compound (C), an organic phosphorus compound which contains the aforementioned components such as phosphonates, phophinates, phosphonites and phosphinites in the molecule thereof may also be used. Specific examples include the followings:

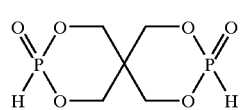

(XI)

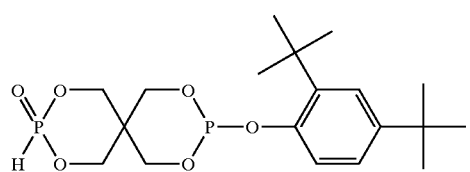

(XII)

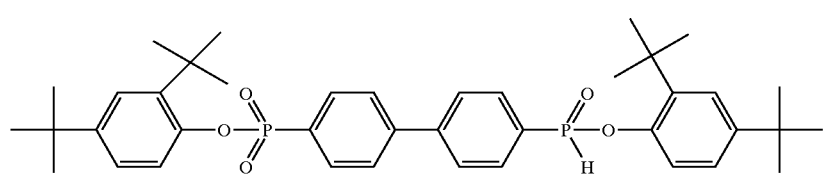

(XII)

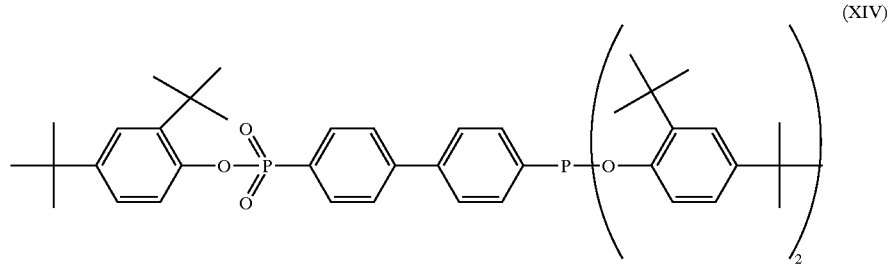

(XIV)

The amount of the specific phosphorus compound to be blended in the present invention is preferably 0.001-2.0 parts by weight, and more preferably 0.01-0.5 part by weight to 100 parts by weight in total of the components (A) and (B). When the amount is less than 0.001 part by weight, the effect of modifying the liquid crystal polymer into a fibrous state during the molding process is small. When the amount exceeds 2.0 parts by weight, the physical properties of the material may deteriorate.

Further, a thermoplastic resin which does not form an anisotropic molten phase other than the compounds (A) and (B) may be blended in an amount of 1-90 parts by weight to 100 parts by weight in total of the compounds (A) and (B) in the present invention. Examples of such an additional thermoplastic resin include polyethylene, polypropylene, ethylene-propylene copolymer, ethylene-vinyl acetate copolymer, polyamide, polyacetal, stylene-based resins such as polystylene, stylene-butadiene copolymer, stylene-butadiene-acrylonitrile copolymer and stylene-acrylonitrile copolymer, polyurethane, fluororesin, polyphenyleneoxide, polyphenylenesulfide, polybutadiene, butyl rubber, silicone resin, olefin-based thermoplastic elastomer, stylene-based thermoplastic elastomer, urethane-based thermoplastic elastomer, polyester-based thermoplastic elastomer, polyamide-based thermoplastic elastomer, polyether-based thermoplastic elastomer, multi-layer graft copolymer mainly containing polyacrylate and modified compounds thereof. Among them, preferred are stylene-based resin and polyphenyleneoxide which show relatively good mutual solubility to a polyester resin.

Furthermore, it is desirable to blend one or more kinds of silane compounds selected from vinylalkoxysilane, aminoalkoxysilane and mercaptoalkoxysilane in the present invention. By blending this component, an injection-molded article that shows little peeling on the surface thereof can be obtained.

Additionally, the molded article of the blend composition of the present invention can be blended with various types of fibrous, powder and plate inorganic fillers according to the purposes of application. Examples of fibrous fillers include inorganic fibrous substances such as glass fibers, asbestos fibers, silica fibers, silica/alumina fibers, alumina fibers, zirconia fibers, boron nitride fibers, silicon nitride fibers, boron fibers, potassium titanate fibers, and further, fibrous metals, e.g., stainless, aluminum, titanate, copper and brass. Examples of powdery fillers include silicate such as carbon black, graphite, silica, quartz powders, glass beads, milled glass fibers, glass balloons, glass powders, calcium silicate, aluminum silicate, kaoline, talc, clay, diatom earth and wollastonite, metal oxide such as iron oxide, titanium oxide, zinc oxide, antinomy trioxide and alumina, metal carbonate such as calcium carbonate and magnesium carbonate, metal sulfate such as calcium sulfate and barium sulfate, and further, ferrite, silicon carbide, silicon nitride, boron nitride, and other various metal powders. Examples of tabular fillers include mica, glass flakes, various metal foils and the like. One or two or more types of these inorganic fillers can be used together. Moreover, the inorganic fillers used in the present invention can be used in combination with a known surface treatment agent in accordance with desired physical properties. For example, functional compounds such as epoxy compounds, isocyanate compounds, titanate compounds and silane compounds are cited. Preferably, treatment is performed with the compounds other than amino compounds, such as epoxy compounds and polyamide compounds. These fillers may be used after surface treatment, or added at the same time of material preparation. Herein, the amount of the inorganic fillers to be blended is preferably 1 to 100 parts by weight based on 100 parts by weight of the total amount of (A) and (B).

Moreover, the molded article may be flame-retarded by blending a flame retardant. As the flame retardant, organic halogen compounds and the like are used, but especially aromatic bromine compounds are preferable. Additionally, as a flame retardant assistant, metal oxide and hydroxide such as antimony trioxide, antimony halide, aluminum hydroxide and magnesium hydroxide are preferably used.

In this resin composition, LCP is preferably present as fibers having an average aspect ratio of 5 or more inside the molded article, especially preferably having the average aspect ratio of 8 or more. When the average aspect ratio is less than 5, a high strength and a high elasticity modulus as the characteristics of this resin composition cannot be obtained, and especially, a thin-film molded article for miniaturization and lightening cannot obtain a sufficient rigidity.

The composition of the present invention can generally be prepared by the equipment and methods used in preparing a synthetic resin composition. For example, there is a method of mixing necessary components, using a uniaxial or twin-screw extruder, kneading/extruding to prepare molding pellets and, subsequently, molding; a method of once preparing pellets having different compositions from one another, mixing a specific amount of the pellets to be subjected to molding, and obtaining a molded article having an intended composition; or the like. Namely, any method of preparing the composition before molding may be used, since LCP is formed into fibers during molding in the present invention. Additionally, LCP contained in the composition is preferably molded at a temperature at which LCP flows by a shearing force during molding, especially at a temperature of a melting point of LCP or higher. When the temperature is the LCP's melting point or higher, the LCP's property of easy flow by the shearing force is utilized, and LCP can easily be formed into fibers by the shearing force.

EXAMPLES

Hereinafter, the present invention will be described in more detail with reference to the following examples, but the present invention is not limited to the examples.

Example 1

0.1 part by weight of dioleylphosphonate (manufactured by Johoku Kagaku Kogyo Co., Ltd.) was added to a resin component containing 80 parts by weight of a polycarbonate resin (Upiron S3000, manufactured by Mitsubishi Gas Chemical Co., Ltd.) and 20 parts by weight of a liquid crystal polymer (A950, manufactured by Polyplastics Co., Ltd.). The mixture was melt-kneaded at a resin temperature 290° C. in a 30 mm twin-screw extruder, and pelletized to obtain the aimed resin composition.

In the extrusion process, the aimed resin composition was prepared with removing the volatile components via a vent by a pressure-reducing operation, while care was taken so that air should not be mixed into the kneaded materials and oxidize them.

Then, the obtained pellets were formed by injection molding into a test piece having thickness of 0.8 mm, width of 12.7 mm and length of 131 mm at a resin temperature 290° C.

The bending strength and flexural modulus of the test piece were measured according to ASTM D 790.

The test piece was cut in the flow direction and the surface of the section was mirror-polished. When the polished surface was observed by an electronic microscope to evaluate the condition of the surface, it was observed that the liquid crystal polymer formed a fibrous structure in the polycarbonate resin. 50 fibers of the liquid crystal polymer in a fibrous state were arbitrarily chosen and thickness/diameter thereof were measured to calculate the average values of thickness/diameter. With respect to the length of the fibers, the length which could be observed on the surface was measured.

Comparative Example 1

A test piece was molded and physical properties thereof were evaluated in the same manner as Example 1 except that dioleylphosphonate was not added. Further, the test piece was cut in the flow direction and the surface of the section was mirror-polished. When the polished surface was observed by an electronic microscope to evaluate the condition of the surface, a structure was observed in which the liquid crystal polymer was dispersed insularly in the polycarbonate resin.

Examples 2–5, Comparative Examples 2–3

A test piece was molded and physical properties thereof were evaluated in the same manner as Example 1 except that a phosphorus compound shown in Table 1 was added in an amount shown in Table 1 in place of dioleylphosphonate.

Example 6

A test piece was molded and physical properties thereof were evaluated in the same manner as Example 1 except that the blending ratio of the polycarbonate resin to the liquid crystal polymer was changed as shown in Table 1.

Example 7

A test piece was molded and physical properties thereof were evaluated in the same manner as Example 1 except that the polyarylate resin (U-Polymer, U-1000 manufactured by Unichika Co., Ltd.) was used in place of the polycarbonate resin.

Comparative Example 4

A test piece was molded and physical properties thereof were evaluated in the same manner as Example 7 except that dioleylphosphonate was not added.

Example 8

0.1 part by weight of dioleylphosphonate and 30 parts by weight of glass fiber (chopped strand having a fiber diameter of 13 μm and a fiber length of 5 mm) were added to a resin component containing 50 parts by weight of the polycarbonate resin and 20 parts by weight of the liquid crystal polymer. Then, a test piece was molded and physical properties thereof were evaluated in the same manner as other Examples.

Example 9

0.1 part by weight of dioleylphosphonate, 30 parts by weight of glass fiber (chopped strand having a fiber diameter of 13 μm and a fiber length of 5 mm) and 10 parts by weight of fine mica having the average particle diameter of 18 μm and the average aspect ratio of 20 were added to a resin component containing 40 parts by weight of the polycarbonate resin and 20 parts by weight of the liquid crystal polymer. Then, a test piece was molded and physical properties thereof were evaluated in the same manner as other Examples (except that a 44 mm twin-screw extruder was used).

Comparative Example 5

A test piece was molded and physical properties thereof were evaluated in the same manner as Example 9 except that dioleylphosphonate was not added. In this test piece, the dispersed state of the liquid crystal copolymer was not observed.

The results of evaluation described above are shown in Table 1.

an anisotropic molten phase selected from the group consisting of polycarbonate resin, polyethylene terephthalate resin, polybutylene terephthalate resin, polyarylate resin, and mixtures thereof, and 1 to 50 parts by weight of a liquid crystal polymer (B) capable of forming an anisotropic molten phase, and 0.001 to 2.0 parts by weight of one or more kinds of compounds (C) selected from phosphorus oxoacid monoesters and diesters represented by the following formulae (I) and (II):

$(X)_n P(=O)(OR)_{3-n}$      (I)

$(X)_n P(OR)_{3-n}$      (II)

wherein n is 1 or 2; X is a hydrogen atom, a hydroxyl group or a monovalent organic group and, when there are plural X's, they may be the same or different; and R is a monovalent organic group and, when there are plural R's, they may be the same or different.

TABLE 1

| | Ex. 1 | Ex. 2 | Ex. 3 | Ex. 4 | Ex. 5 | Ex. 6 | Ex. 7 | Ex. 8 | Ex. 9 | Com. Ex. 1 | Com. Ex. 2 | Com. Ex. 3 | Com. Ex. 4 | Com. Ex. 5 |
|---|---|---|---|---|---|---|---|---|---|---|---|---|---|---|
| Composition (parts by weight) | | | | | | | | | | | | | | |
| (A) Polycarbonate resin | 80 | 80 | 80 | 80 | 80 | 60 | | 50 | 40 | 80 | 80 | 80 | | 40 |
| (A) Polyarylate resin | | | | | | | 80 | | | | | | 80 | |
| (B) Liquid crystal polymer (A950) | 20 | 20 | 20 | 20 | 20 | 40 | 20 | 20 | 20 | 20 | 20 | 20 | 20 | 20 |
| (C) | | | | | | | | | | | | | | |
| Dioleylphosphonate | 0.1 | | | | | 0.1 | 0.1 | 0.1 | 0.1 | | | | | |
| Dioctadecylphosphonate | | 0.1 | 0.3 | | | | | | | | | | | |
| Dinonylphenylphosphonate | | | | 0.1 | | | | | | | | | | |
| Mixture of monostearylphophate/destearylphosfate in 44/55 | | | | | 0.1 | | | | | | | | | |
| Bis(2,6-di-t-butyl-4-metylphenyl)pentaerythritoldiphosphite | | | | | | | | | | | 0.1 | | | |
| Tridecylphosphate | | | | | | | | | | | | 0.1 | | |
| Glass fiber | | | | | | | | 30 | 30 | | | | | 30 |
| Mica | | | | | | | | | 10 | | | | | 10 |
| Evaluation | | | | | | | | | | | | | | |
| Bending strength MPa | 145 | 140 | 138 | 143 | 135 | 168 | 195 | 240 | 224 | 95 | 110 | 93 | 120 | 123 |
| Flexial modulus MPa | 6070 | 6080 | 6010 | 6100 | 5800 | 8350 | 6550 | 14900 | 16300 | 2880 | 4500 | 2850 | 2780 | 11000 |
| Dispersing state of liquid crystal polymer | fibrous | fibrous | fibrous | fibrous | fibrous | fibrous | fibrous | fibrous | fibrous | insular | fibrous | insular | insular | — |
| Average aspect ratio of liquid crystal polymer | 9.0 | 7.2 | 7.3 | 8.6 | 6.5 | 6.4 | 5.8 | >9.0 | >9.0 | 1.5 | 4.2 | 1.3 | 1.1 | — |

What is claimed is:

1. A thermoplastic resin composition comprising 100 parts by weight in total consisting of 99 to 50 parts by weight of a thermoplastic polyester resin (A) which does not form 2. The composition according to claim 1, wherein the thermoplastic polyester resin (A) not forming an anisotropic molten phase is one or more kinds of resins selected from polycarbonate resin and polyarylate resin.

3. The composition according to claim 1, wherein the thermoplastic polyester resin (A) not forming an anisotropic molten phase is polycarbonate resin.

4. The composition according to claim 1, wherein the thermoplastic polyester resin (A) is polyethylene terephthalate resin and/or polybutylene terephthalate resin.

5. The composition according to claim 1, wherein the phosphorus oxoacid monoester and diester (C) are phosphonates represented by the following formula (III):

$$H(OH)_mP(=O)(OR)_{2-m} \qquad (III)$$

wherein m is 0 or 1 and R is a monovalent organic group.

6. The composition according to claim 1, which further contains a thermoplastic resin not forming an anisotropic molten phase, other than (A) and (B), in an amount of 1 to 90 parts by weight to 100 parts by weight of the total amount of (A) and (B).

7. The composition according to claim 1, which further contains an inorganic filler in an amount of 1 to 100 parts by weight to 100 parts by weight of the total amount of (A) and (B).

8. A molded article prepared by molding the composition according to claim 1.

9. An injection molded article, wherein the liquid crystal polymer (B) capable of forming an anisotropic molten phase is present in the state of fibers having an average aspect ratio of 5 or more in a matrix of the thermoplastic polyester resin (A) not forming an anisotropic molten phase as a result of an injection molding of the composition according to claim 1.

10. The composition according to claim 4, wherein the phosphorus oxoacid monoester and diester (C) are phosphonates represented by the following formula (III):

$$H(OH)_mP(=O)(OR)_{2-m} \qquad (III)$$

wherein m is 0 or 1 and R is a monovalent organic group.

11. The composition according to claim 2, wherein the phosphorus oxoacid monoester and diester (C) are phosphonates represented by the following formula (III):

$$H(OH)_mP(=O)(OR)_{2-m} \qquad (III)$$

wherein m is 0 or 1 and R is a monovalent organic group.

12. The composition according to claim 3, wherein the phosphorus oxoacid monoester and diester (C) are phosphonates represented by the following formula (III):

$$H(OH)_mP(=O)(OR)_{2-m} \qquad (III)$$

wherein m is 0 or 1 and R is a monovalent organic group.

13. The composition according to claim 2, which further contains a thermoplastic resin not forming an anisotropic molten phase, other than (A) and (B), in an amount of 1 to 90 parts by weight to 100 parts by weight of the total amount of (A) and (B).

14. The composition according to claim 2, which further contains an inorganic filler in an amount of 1 to 100 parts by weight to 100 parts by weight of the total amount of (A) and (B).

15. A molded article prepared by molding the composition according to claim 2.

16. An injection molded article, wherein the liquid crystal polymer (B) capable of forming an anisotropic molten phase is present in the state of fibers having an average aspect ratio of 5 or more in a matrix of the thermoplastic polyester resin (A) not forming an anisotropic molten phase as a result of an injection molding of the composition according to claim 2.

17. A thermoplastic resin composition comprising 100 parts by weight in total consisting of 99 to 50 parts by weight of a thermoplastic polyester resin (A) which does not form an anisotropic molten phase and 1 to 50 parts by weight of a liquid crystal polymer (B) capable of forming an anisotropic molten phase, and 0.001 to 2.0 parts by weight of one or more phosphonates (C) represented by the following formula:

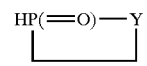

wherein Y is a divalent α, ω-dioxy organic group.

18. The composition according to claim 17, wherein the thermoplastic polyester resin (A) not forming an anisotropic molten phase includes one or more kinds of resins selected from polycarbonate resin, polyalkylene terephthalate resin and polyarylate resin.

19. The composition according to claim 17, wherein the thermoplastic polyester resin (A) not forming an anisotropic molten phase includes one or more kinds of resins selected from polycarbonate resin and polyarylate resin.

20. The composition according to claim 3, which further contains a thermoplastic resin not forming an anisotropic molten phase, other than (A) and (B), in an amount of 1 to 90 parts by weight to 100 parts by weight of the total amount of (A) and (B).

21. The composition according to claim 4, which further contains a thermoplastic resin not forming an anisotropic molten phase, other than (A) and (B), in an amount of 1 to 90 parts by weight to 100 parts by weight of the total amount of (A) and (B).

22. A molded article prepared by molding the composition according to claim 3.

23. A molded article prepared by molding the composition according to claim 4.

24. An injection molded article, wherein the liquid crystal polymer (B) capable of forming an anisotropic molten phase is present in the state of fibers having an average aspect ratio of 5 or more in a matrix of the thermoplastic polyester resin (A) not forming an anisotropic molten phase as a result of an injection molding of the composition according to claim 3.

25. An injection molded article, wherein the liquid crystal polymer (B) capable of forming an anisotropic molten phase is present in the state of fibers having an average aspect ratio of 5 or more in a matrix of the thermoplastic polyester resin (A) not forming an anisotropic molten phase as a result of an injection molding of the composition according to claim 4.

* * * * *